United States Patent
Malsam

(10) Patent No.: US 8,437,498 B2
(45) Date of Patent: May 7, 2013

(54) SELF PROPELLED MECHANIZED IRRIGATION SYSTEM WITH A REMOTE VISUAL MONITORING SYSTEM

(75) Inventor: Craig S. Malsam, Omaha, NE (US)

(73) Assignee: Valmont Industries Inc., Omaha, NE (US)

( * ) Notice: Subject to any disclaimer, the term of this patent is extended or adjusted under 35 U.S.C. 154(b) by 37 days.

(21) Appl. No.: 13/222,745

(22) Filed: Aug. 31, 2011

(65) Prior Publication Data

US 2012/0048960 A1    Mar. 1, 2012

Related U.S. Application Data

(60) Provisional application No. 61/378,584, filed on Aug. 31, 2010.

(51) Int. Cl.
*G06K 9/00*    (2006.01)
*B67D 7/08*    (2010.01)

(52) U.S. Cl.
USPC ............................................ 382/100; 239/71

(58) Field of Classification Search ........................ None
See application file for complete search history.

(56) References Cited

U.S. PATENT DOCUMENTS

| | | | | |
|---|---|---|---|---|
| 5,246,164 | A | * | 9/1993 | McCann et al. ................ 239/11 |
| 6,199,000 | B1 | * | 3/2001 | Keller et al. ..................... 701/50 |
| 7,343,867 | B2 | * | 3/2008 | Fraisse et al. ................. 111/118 |
| 2004/0032973 | A1 | * | 2/2004 | Robeson et al. ............. 382/110 |
| 2007/0042803 | A1 | * | 2/2007 | Anderson .................. 455/556.1 |
| 2007/0242871 | A1 | * | 10/2007 | Prociw et al. ................. 382/141 |
| 2008/0219769 | A1 | * | 9/2008 | Ding et al. ......................... 405/45 |
| 2010/0032493 | A1 | * | 2/2010 | Abts et al. ........................ 239/11 |
| 2012/0067969 | A1 | * | 3/2012 | Gong ............................... 239/10 |
| 2012/0284264 | A1 | * | 11/2012 | Lankford et al. ............. 707/736 |

* cited by examiner

Primary Examiner — Bhavesh Mehta
Assistant Examiner — Tahmina Ansari
(74) Attorney, Agent, or Firm — Advent, LLP

(57) ABSTRACT

The present disclosure is a mechanized irrigation system with an ability to provide the operator with the ability to remotely monitor actual crop growth and crop health, remotely determine the appropriate applicants, and remotely control the mechanized irrigation equipment to apply those applicants.

13 Claims, 2 Drawing Sheets

SELF PROPELLED MECHANIZED IRRIGATION SYSTEM WITH A REMOTE VISUAL MONITORING SYSTEM

CROSS-REFERENCE TO RELATED APPLICATIONS

The present application claims the benefit of 35 U.S.C. §119(e) of U.S. Provisional Application Ser. No. 61/378,584, filed Aug. 31, 2010, and titled "SELFPROPELLED MECHANIZED IRRIGATION SYSTEM WITH A REMOTE VISUAL MONITORING SYSTEM," which is herein incorporated by reference in its entirety.

BACKGROUND

The present disclosure is in the technical field of Self Propelled Mechanized Irrigation. More particularly, the present disclosure is in the technical field of water, fertilizer, herbicide and/or pesticide application based on remote crop monitoring.

Self Propelled Mechanized Irrigation systems have become an essential component in present day commercial agriculture since their introduction over sixty years ago. The Self Propelled Mechanized Irrigation system may be any type of irrigation system known in the art, with two prevalent irrigation systems being center pivot and linear move. One notable improvement in the art was the introduction and development of remote monitors and controls, designed to allow the management of mechanized irrigation equipment without requiring the operator to be in the field. This has drastically reduced the time labor required to manage mechanized irrigation equipment. Another notable improvement in the art was the introduction of remote soil moisture monitoring and remote weather and climate monitors. This allowed remote management of mechanized irrigation equipment based upon remote soil moisture measurements and remote climate monitoring. Another notable improvement in the art was the introduction of remote infra-red camera imagery, using canopy temperature to determine crop density or crop health. However, even with these advancements, the operator cannot actually remotely visually monitor the crop itself to determine the appropriate application of water, fertilizer, herbicides and/or pesticides.

There are many benefits that can be obtained by overcoming this shortcoming in the prior art, including, but not limited to increased yields, increased disease and pest control and increased efficiencies in the application of water, fertilizer, herbicides and/or pesticides, and resulting lower operating costs. Therefore, a need exists in the art for an irrigation system with an ability to provide the operator the ability to remotely monitor actual crop growth and crop health.

SUMMARY

The present disclosure is generally directed to a mechanized irrigation system including an electronic controller equipped with a camera for imaging crops in the field so that the crop growth stage, crop disease conditions, crop wilt conditions, and crop pest conditions may be determined. As the mechanized irrigation system travels an irrigation path, images of the field and crops can be obtained remotely. Based on the ability to remotely monitor these crop conditions, the operator can remotely determine and apply the desired amount of water or other applicants This Summary is provided solely to introduce subject matter that is fully described in the Detailed Description and Drawings. Accordingly, the Summary should not be considered to describe essential features nor be used to determine scope of the claims.

DETAILED DESCRIPTION

Figure 1:
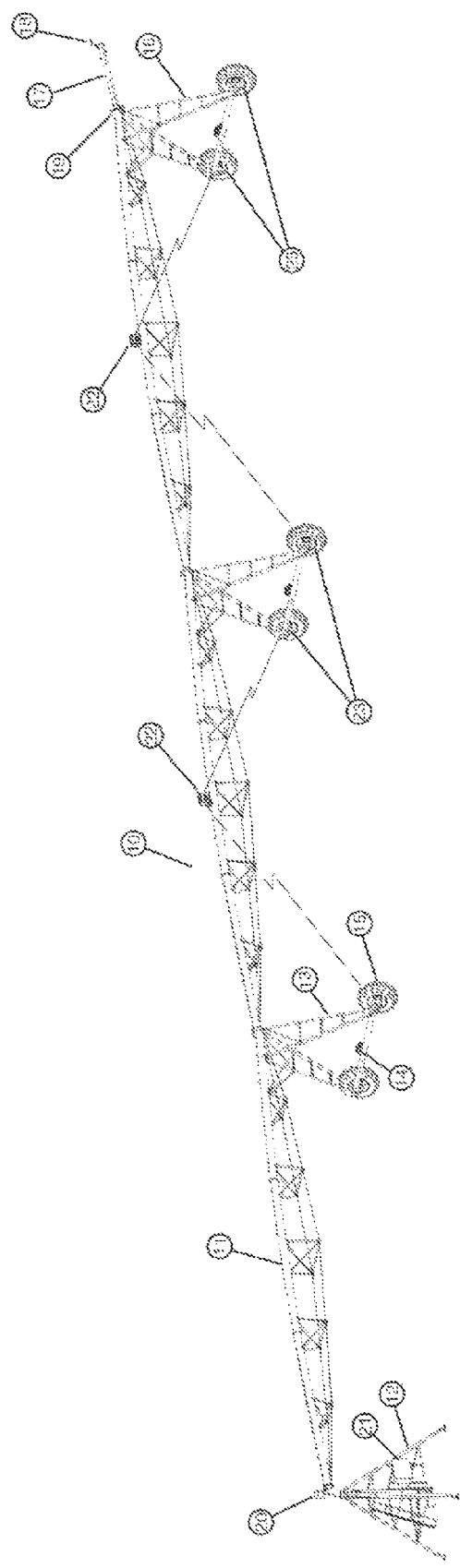
FIG. 1 is a perspective view of a center pivot irrigation system.

Referring now to the disclosure in more detail, in FIG. 1, there are two prevalent self propelled irrigation system 10 types, being center pivot and linear move. FIG. 1 illustrates an embodiment of the present disclosure wherein irrigation system 10 is a center pivot, which includes a water conduit, pipe or boom 11 which extends outwardly from a conventional center pivot structure 12. Water pipe 11 is comprised of a plurality of pipe sections joined together in an end-to-end relationship, which are supported upon a plurality of drive units 13, each of which has a drive means 14 of propelling the wheel 15 thereof. In most cases, the drive means 14 will comprise an electric motor which may be reversible so that the system may be driven in either a forward direction or a reverse direction. Normally, the machine alignment on the center pivot system is maintained by a mechanical linkage at each drive unit span joint, which operates a micro-switch which in turn starts and stops the electric motor on the drive unit to keep in line with the next span. The last drive unit on the system will be designated by reference numeral 16. Normally, a cantilevered boom, know as an overhang assembly, 17 extends outwardly form the last drive unit and has an end gun 18 mounted thereon which is actuated to irrigate areas outside the area covered by the water pipe between the center pivot structure and the last drive unit.

A Speed Control 19 is typically mounted on the last drive unit 16. Typically, this speed control is a percent timer, but can also be a variable speed drive or other speed control device which is connected to the electric motor 14 on the last drive unit 16.

A position sensor is also mounted on the irrigation system 10. Typically, this is either a angle sensor 20 mounted at the center pivot structure 12, or a GPS receiver mounted on or near the last drive unit 16.

A conventional computer control panel 21 is mounted on the center pivot structure and controls many machine functions including but not limited to speed, direction, water on or off, start or stop, end guns on or off, etc. The control panel 21 is connected to the angle sensor 20, and speed control 19, which in turn is connected to drive 14. Computer control panel 21 is also used for user defined inputs.

A Remote Visual Monitoring System 22 is mounted anywhere on the self propelled irrigation system that provides an operator the ability to remotely monitor and control the functions of the irrigation system as well as remotely obtain images of the crop, in particular, visible spectrum images.

Figure 2:
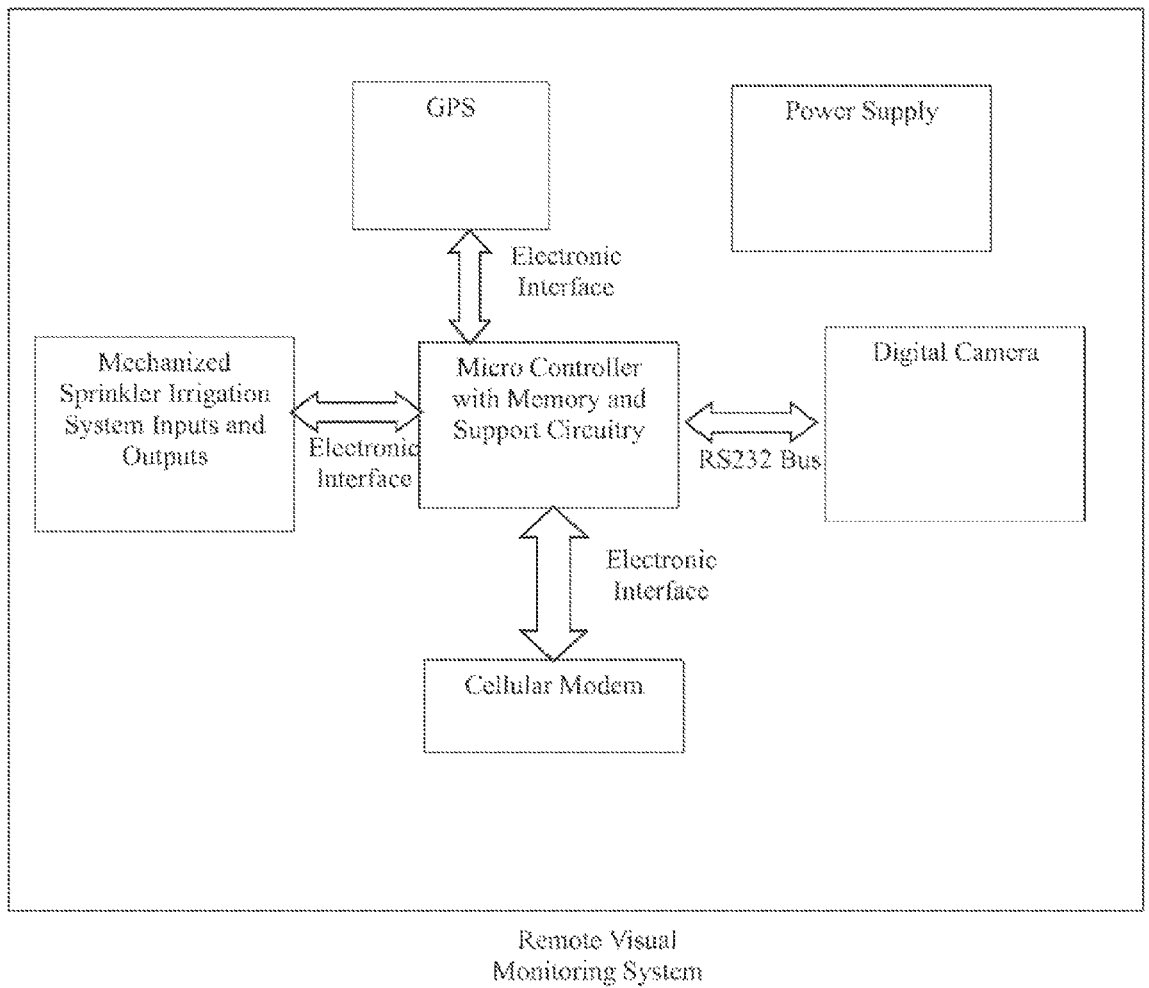
FIG. 2 is a block diagram of the Remote Visual Monitoring system.

In more detail, referring to the disclosure of FIG. 2, the embodiment of the disclosure consists of an electronic controller consisting of a visible spectrum camera, preferably a digital camera compatible with providing images over a cellular or other data network, similar to the COMedia C328R, coupled with a telemetry means being a GSM Cellular Modem, Satellite Modem, CDMA Modem, VHF/UHF Modem, or other telemetry modem. The Camera and Modem of the Electronic Controller could be contained within the same housing or two separate housings depending on the requirements of the application. The Electronic Controller with Camera would be mounted on the mechanized sprinkler irrigation system at one or more locations depending upon the areas to be monitored in the field and mounted at different heights and angles to obtain the optimum view of the plant and crop canopy. The images may then be provided to a remote user or computer program that determines growth stage of the plants in the image, plant height, number of leaves, canopy coverage, disease stage, etc. With this information the remote user and/or computer program can then use methods to determine the amount of water, fertilizers, pesticides, fungicides, herbicides, or other plant management applicants required.

The Electronic Controller may also consist of remote monitoring and control capabilities for the mechanized sprinkler irrigation system. So, in addition to being able to remotely monitor the plant and determining the plant needs, the user can monitor and control the mechanized sprinkler irrigation system using the same Electronic Controller.

This embodiment would be very desirable to allow retrofitting of the present invention to existing mechanized irrigation systems.

The advantages of the present disclosure include, without limitation, the ability for an operator to remotely monitor crop conditions, and remotely determine and control the appropriate applicant, including water. water, fertilizer, herbicides and/or pesticides.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A method for applying an applicant to an agricultural field, the method comprising:
   transmitting, by way of a transceiver device, an image of at least one crop plant to a remote device, the image of the at least one crop plant generated by an imaging device coupled to a structural member of an irrigation assembly;
   receiving, at the transceiver device, an instruction from the remote device, the instruction representing a desired amount of applicant to disperse from the irrigation assembly; and
   initiating dispersal of the desired amount of applicant to the agricultural field from the irrigation assembly in response to receiving the instruction.

2. The method of claim 1, wherein the image device comprises a visible spectrum digital camera.

3. The method of claim 1, further comprising receiving a control instruction from the remote device, the control instruction representing an instruction to control operation of at least one sprinkler coupled to the irrigation assembly; and
   initiating the at least one sprinkler to function in accordance with the at least control instruction.

4. The method of claim 1, wherein the applicant is selected from the group consisting of water, fertilizers, pesticides, fungicides, herbicides, and mixtures thereof.

5. A self-propelled irrigation system comprising:

an irrigation assembly, the irrigation assembly comprising:

a conduit configured to supply an applicant, the conduit coupled to a plurality of drive towers;

a plurality of sprinkler dispersal devices coupled to the conduit, the plurality of sprinkler dispersal devices configured to disperse the applicant;

at least one imaging device coupled to the irrigation assembly, the imaging device configured to capture images of one or more crop plants;

an electronic controller in electronic communication with the imaging device and operatively coupled to the plurality of sprinkler dispersal devices; and a telemetry device in electronic communication with the electronic controller, the telemetry device configured to transmit the captured images to a remote device and to receive one or more control instructions from the remote device, the one or more control instructions representing a desired amount of applicant to disperse from the plurality of sprinkler dispersal devices, wherein the electronic controller is configured to cause the plurality of sprinkler dispersal devices to disperse the desired amount of applicant to the one or more crop plants in response to receiving the one or more control instructions from the remove device.

6. The self-propelled irrigation system of claim 5, wherein the at least one imaging device is a visible spectrum camera.

7. The self-propelled irrigation system of claim 5, wherein a first imaging device of the at least one imaging device is coupled to the irrigation assembly at a first height and a second imaging device of the at least one imaging device is coupled to the irrigation assembly at a second height, the first height different from the second height.

8. The method as recited in claim 1, wherein transmitting, by way of a transceiver device, an image of at least one crop plant further comprising transmitting, by way of a transceiver device, a first image of at least one crop plant to a remote device, the first image of the at least one crop plant generated by a first imaging device coupled to a structural member of an irrigation assembly at a first height and transmitting a second image of the at least one crop plant to the remote device, the second image of the at least one crop plant generated by a second imaging device coupled to a structural member of an irrigation assembly at a second height, the first height different from the second height.

9. A system comprising:

a remote computing device;

a self-propelled irrigation assembly, the self propelled irrigation assembly comprising:

a conduit configured to supply an applicant, the conduit coupled to a plurality of drive towers;

a plurality of sprinkler dispersal devices coupled to the conduit, the plurality of sprinkler dispersal devices configured to disperse the applicant;

at least one imaging device coupled to the irrigation assembly, the imaging device configured to capture images of one or more crop plants;

an electronic controller in electronic communication with the imaging device and operatively coupled to the plurality of sprinkler dispersal devices; and a telemetry device in electronic communication with the electronic controller and with the remote computing device, the telemetry device configured to transmit the captured images to the remote computing device and to receive one or more control instructions from the remote computing device, the one or more control instructions representing a desired amount of applicant to disperse from the plurality of sprinkler dispersal devices, wherein the electronic controller is configured to cause the plurality of sprinkler dispersal devices to disperse the desired amount of applicant to the one or more crop plants.

10. The system as recited in claim 9, wherein the at least one imaging device is a visible spectrum camera.

11. The system as recited in claim 9, wherein a first imaging device of the at least one imaging device is coupled to the irrigation assembly at a first height and a second imaging device of the at least one imaging device is coupled to the irrigation assembly at a second height, the first height different from the second height.

12. The system as recited in claim 9, wherein the applicant is selected from the group consisting of water, fertilizers, pesticides, fungicides, herbicides, and mixtures thereof.

13. The system as recited in claim 9, wherein the remote computing device includes a computer program, the computer program configured to cause the remote computing device to determine a growth stage of the one or more crop plants based upon the images of the one or more plants, the computer program configured to determine the desired amount of applicant based upon the images of the one or more plants and to cause the remote computing device to transmit the one or more control instructions to the telemetry device.

* * * * *